United States Patent

[11] 3,594,035

| [72] | Inventor | Clifford W. Ferguson<br>Morris, Ill. |
|---|---|---|
| [21] | Appl. No. | 798,025 |
| [22] | Filed | Feb. 10, 1969 |
| [45] | Patented | July 20, 1971 |
| [73] | Assignee | Cerco Corporation<br>Joliet, Ill. |

[54] PICKUP TRUCK RACK
4 Claims, 8 Drawing Figs.

[52] U.S. Cl. .................................................. 296/3,
                                                        224/29
[51] Int. Cl. .................................................. B62d 33/00
[50] Field of Search .................................... 296/3, 12;
                                                        224/29

[56] References Cited
UNITED STATES PATENTS
| 2,570,802 | 10/1951 | Hatteburg | 296/3 X |
| 2,720,414 | 10/1955 | Hart | 296/12 |
| 2,947,566 | 8/1960 | Tower | 296/3 X |
| 2,997,330 | 8/1961 | Boultinghouse | 296/3 |
| 3,224,805 | 12/1965 | Clyatt | 296/10 |
| 3,475,046 | 10/1969 | Webster | 296/3 |
| Re. 19,580 | 5/1935 | Rothholz | 296/3 |

Primary Examiner—Benjamin Hersh
Assistant Examiner—Leslie J. Paperner
Attorney—Kinzer, Dorn and Zickert ABSTRACT: Rack for a pickup truck to facilitate transporting of long pieces of equipment such as ladders, boards and the like including upstanding members mountable on the truck box having longitudinally extending side rails extending over the box and the cab of the truck, and cross bars extending between the side rails with stakes on opposite ends between which long pieces of equipment may be arranged.

INVENTOR
CLIFFORD W. FERGUSON

BY
*Kinzer, Dorn & Zickert*

ATTORNEYS

INVENTOR
CLIFFORD W. FERGUSON

BY
Kinzer, Dorn & Zickert
ATTORNEYS

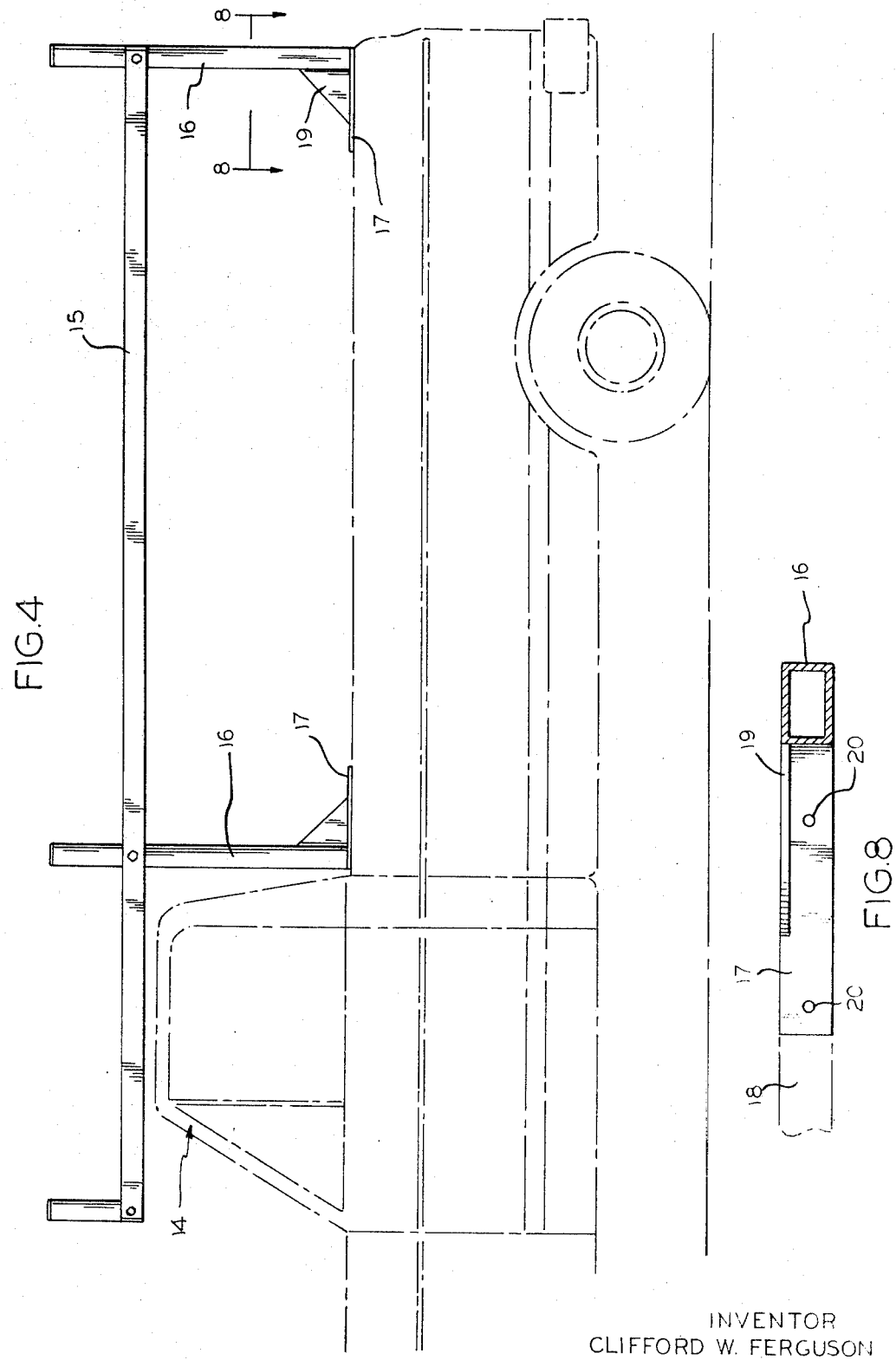

PICKUP TRUCK RACK

This invention relates in general to a rack for a pickup truck that is capable of supporting over the box and cab long pieces of equipment, and more particularly to a rack for a pickup truck that may be easily installed and thereafter removed for use on other trucks, and still more particularly to a rack for a pickup truck that is rigid in design and capable of inhibiting lateral sway at its upper ends.

The pickup truck of the present invention may be provided to the user in knockdown form in a few number of parts that may be easily assembled and mounted on the box of a pickup truck in a short period of time. When shipped in knockdown form, the rack includes opposite side frames and a plurality of crossbars. Each side frame includes a pair of upstanding support members or standards having a plate secured to their lower ends for mounting onto the lip of the truck box. A side rail is secured to the upper ends of each pair of support members and is of such a length that it may extend over the entire box and the cab of the truck. Accordingly, it should be appreciated that the upstanding support members terminate slightly above the cab so that the side rails may extend over the cab. The crossbars are adapted to be fastened to the side frames and in particular to the side rails as they are placed between the side rails and therefore at the upper ends of the support members. Stakes are arranged integrally with the opposite ends of the crossbars and in such a manner that upon mounting in place of a crossbar, they will extend upwardly from the side rails. The stakes provide an area between which long pieces of equipment may be placed in a rest position on the crossbars. Any type of tiedown means may provided to secure the equipment in place on the rack if so desired during transporting of same. In order to eliminate lateral sway of the rack, the upstanding support members are toed-in so that they are slightly inclined toward each other. The mounting plates at the lower ends of the support members are provided with bolt holes to likewise mate with bolt holes in the box lips for receiving bolts to secure the rack to the box. Thus, it can be appreciated that the rack may be easily mounted or demounted by the bolts. Moreover, bolts are provided to secured the crossbars in place and to the side rails, and the entire rack may be easily disassembled and placed in knockdown form by easy removal of the crossbars. The rack does not interfere in any way with the normal operation of the tailgate of the box, whereby large pieces of equipment may be loaded directly into the box while the rack remains in mounted position.

It is therefore an object of the present invention to provide an improved rack for a pickup truck that is capable of supporting long pieces of equipment above the box and cab.

Another object of this invention is in the provision of a rack for a pickup truck capable of supporting long pieces of equipment over the cab which prevents damage to the cab and inhibits vertical bounce of a long piece of equipment held on the rack.

Still another object of this invention is in the provision of a pickup truck rack that may be mounted directly to the pickup truck box easily and quickly and which provides a rigid and durable mounting arrangement, that further permits full use of the tailgate.

A further object of this invention is in the provision of a pickup truck rack that may be easily mounted on a pickup truck box, and thereafter easily demountable from the box and useable over and over again with other pickup trucks.

A still further object of this invention is to provide a pickup truck rack that is capable of supporting long pieces of equipment on the box and cab and which includes a toed-in design that eliminates lateral sway.

Other objects, features and advantages of the invention will be apparent from the following detailed disclosure, taken in conjunction with the accompanying sheets of drawings, wherein like reference numerals refer to like parts, in which:

FIG. 4 is a side elevational view of the rack according to the invention as it appears mounted on a pickup truck that is shown in phantom;

FIG. 8 is a sectional view taken substantially along line 8–8 of FIG. 4 and showing a mounting plate in plan view.

Figure 1:
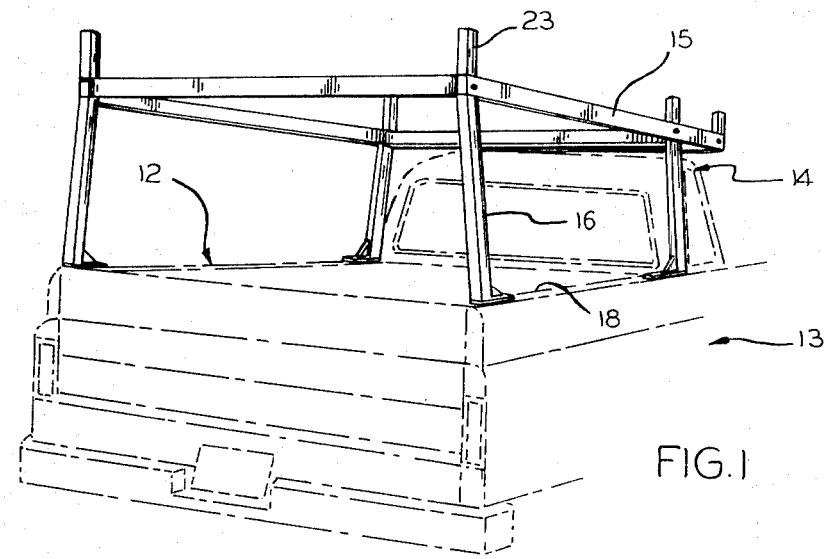
FIG. 1 is a perspective view of the truck rack according to the present invention in assembled form and illustrated as mounted on the box of a pickup truck, where the pickup truck is shown in phantom.
Figure 2:
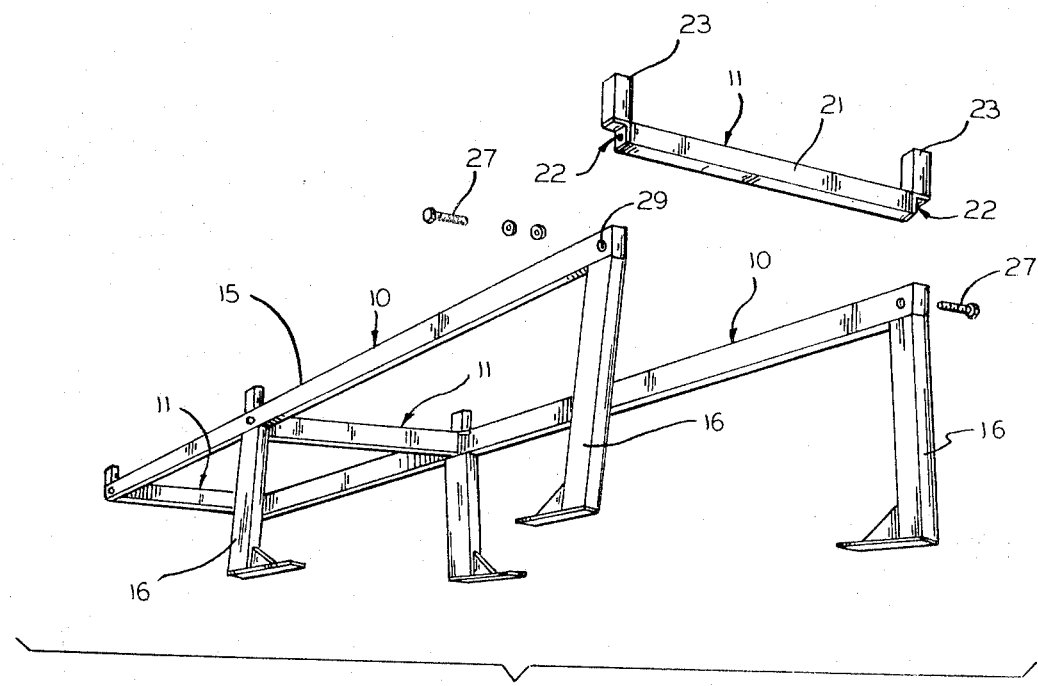
FIG. 2 is a perspective view of the rack according to the invention prior to mounting on a truck, and illustrating one of the crossbars in exploded relation.

The rack of the invention, as seen in FIGS. 1 and 2, generally includes a pair of opposed side frames 10 and a plurality of crossbar units 11 interconnected together, and adapted to be mounted on the box 12 of a pickup truck 13. As is specially illustrated in FIGS. 1 and 4, it is seen that the rack is mounted so as to extend over the box 12 and the cab 14.

Each side frame 10 includes a side rail 15 adaptable to extend horizontally along a side of the truck and a pair of upstanding support members or standards 16 extending perpendicularly to said side rail. Both the side rail and support members are in the form of rectangular steel tubing, although they may be in the form of cylindrical steel tubing if desired. The upper ends of the support members 16 are suitable secured to the side rail 15, such as by welding. As can be seen particularly in FIGS. 3 and 4, the support members 16 terminate slightly above the cab 14 so that the side rails 15 may project forwardly over the cab and in a slightly spaced relation thereabove. Accordingly, the support members are sized to fit a pickup truck on which a rack is to be mounted so that the side rails are spaced above the box and extend over the cab as shown in the drawings.

At the lower ends of the upstanding support members 15, a mounting plate or strap 17, suitably secured thereto such as by welding, facilitates the mounting of the rack onto the truck box, and particularly onto the lip 18 of the box. The lip 18 is formed at the upper edge of the opposed sidewalls of the box. Reinforcing the connection of the plates to the upstanding support members are gusset plates 19, that are triangular in form and secured along one edge to a mounting plate and along the other edge to the upstanding support member at the junction of the mounting plate and the support member. As seen in FIG. 8, bolt holes 20 are provided in the mounting plates, and which are aligned with bolt holes in the lip for receiving bolts that fasten the plates to the lip. While the mounting plates 17 extend inwardly from the front and back support members toward each other in order to permit the upstanding support members to rest at the ends of the box, it should be appreciated that they may extend in either direction depending upon the desirability of the location of the upstanding support members.

Each crossbar 11 includes a crossbar 21, angle iron sections 22 secured to each end of the crossbar, and upstanding stakes 23 secured to the angle iron sections. Both the crossbars and stakes are formed from rectangular tubing, although they may be formed from cylindrical tubing if desired. Preferably, the stakes welded to the top surface of the horizontal flange 24, while the crossbar 21 is welded to the inner surface of the vertical flange 25 of an angle iron section. Accordingly, each stake 23 is offset outwardly from the corresponding end of a crossbar. While the stakes 23 are illustrated as extending vertically relative to the crossbar, it should be appreciated that they may be inclined relative thereto. The length of the crossbar 21 and the thickness of the angle iron section flanges 25 are such that the crossbar units fit between the opposed side rails 15, as seen particularly in FIG. 3.

In order to secure the crossbar units 11 to the side rails, a bolt hole 26 is formed in each vertical flange 25 to receive the end of a bolt 27. A nut 28 is suitably secured, such as by welding to the inner surface of the angle iron flange 25 in axial alignment with the bolt hole 26 to receive the threaded end of the bolt 27. Bolt holes 29 are provided in the side rails 15 in alignment with the upstanding member 16 and at the forward end of a side rail for receiving bolts 27 that are ultimately anchored in nuts secured to the crossbar units. Thus, the rear crossbar units are aligned with upstanding support members, the latter on opposite sides also being oppositely aligned.

It can now be appreciated that the rack of the present invention may be shipped in knockdown form by including a pair of opposed side frames 10, together with 3 crossbar units 11 and the appropriate bolts for securing the crossbar units to the side frames. Mounting of the rack onto a pickup truck and box merely involves the securing of the side frames to the box by applying bolts to the mounting plates and box lip, and thereafter positioning the crossbar units 11 so that the bolts 27 may be applied to lock the crossbar units to the side frames. Similarly, demounting and disassembling of the rack may be accomplished by performing these steps in reverse. While three crossbar units are illustrated, it should be appreciated that any number may be provided.

Figure 3:
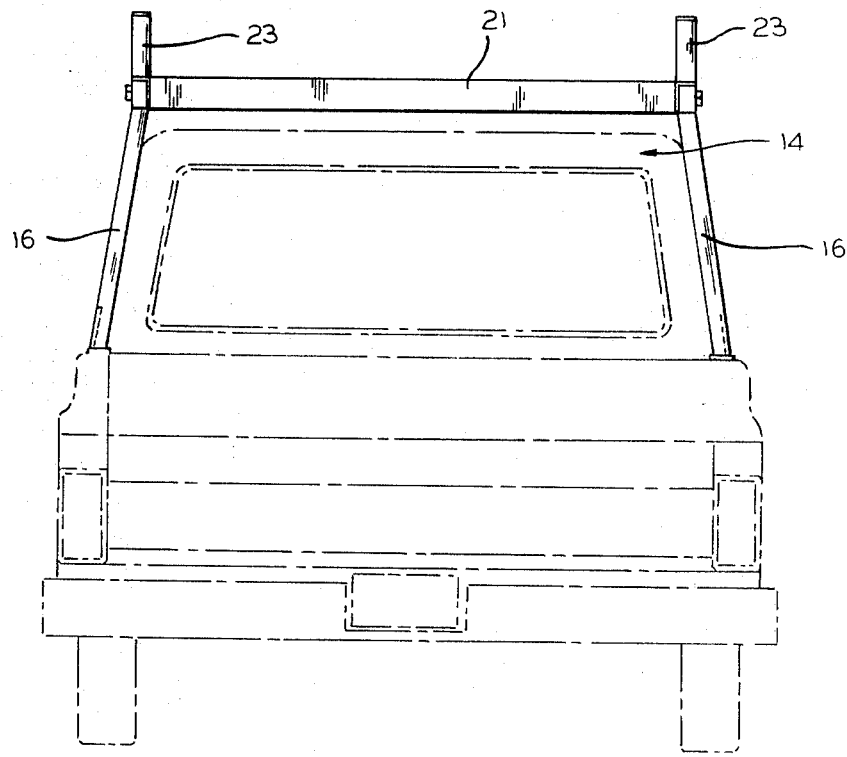
FIG. 3 is a rear elevational view of the truck rack according to the invention as it appears mounted on a pickup truck that is shown in phantom.
Figure 5:
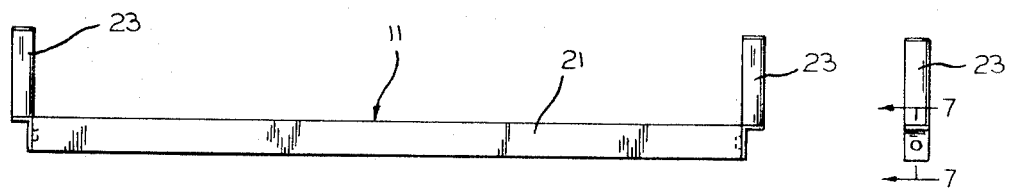
FIG. 5 is a side elevational view of crossbar unit of the rack of the present invention.
Figure 6:
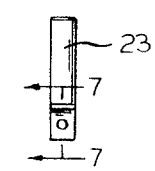
FIG. 6 is an end elevational view of the crossbar shown in FIG. 5.
Figure 7:
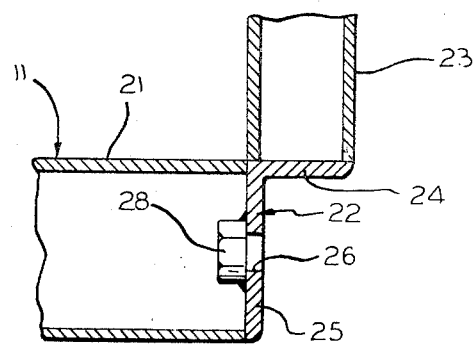
FIG. 7 is an enlarged detailed sectional view taken substantially along line 7–7 of FIG. 6.

Referring now to FIGS. 1 and 3, it may be seen that the upstanding support members 16 are toed-in or inclined slightly inwardly at their upper ends, this arrangement inhibiting, if not preventing lateral sway of the rack when a load is supported by the crossbars 21. Any long pieces of equipment, such as ladders or boards, may be supported by the rack by resting them on the crossbars 21 between the stakes 23. If necessary, any type of tiedown means may be employed for holding pieces of equipment on the rack. For example, tiedown rings or loops may be mounted on the upstanding support members to receive ropes or the like. It should also be appreciated that ropes may be tied directly to any of the stakes, crossbars or side rails.

It will be understood that modifications and variations may be effected without departing from the scope of the novel concepts of the present invention.

I hereby claim the invention as follows:

1. A pickup truck rack adapted to be mounted on the lip of the truck box comprising a pair of opposed upstanding side frames to extend along the side of the truck box, and a plurality of crossbar units interconnected therewith, said opposed side frames including a plurality of support members and side rails, said support members being secured to the lip of the box and extending upwardly just above the top of the cab, the side frames being inclined inwardly from the lip of the box, said side rails extending along the upper ends of the support members and over the box and over the cab, said crossbar units being secured at opposite ends and intermediate of the side rails, each crossbar unit including a crossbar and stakes at each end extending perpendicular thereto and upwardly, said stakes being secured to the crossbars so that the crossbars extend between the side rails and the stakes extend upwardly from the side rails.

2. In a pickup truck including a cab and a box having its upper end terminating in a lip at a level substantially below the top of the cab, the improvement in a rack mountable on the box for supporting articles at a level above the top of the cab, said rack comprising a plurality of support members upstanding from opposite sides of the box, one on each corner and terminating a slight distance above the cab, said support members of one side being inclined inwardly from the lip of the box towards the support members of the other side to inhibit lateral swaying of the rack, plate members secured to the lower ends of the support members and bearing on the lip of the box, a pair of side rails, one on each side of the box welded to the upper ends of the support members, a plurality of crossbar units mounted on said rails and extending transverse the box, and fastener means for securing the crossbar units to said side rails, each crossbar unit including a crossbar and stakes extending perpendicular thereto from opposite ends and upwardly so that they extend upwardly from the side rails.

3. The combination as defined in claim 2, wherein the side rails extend over the cab and a crossbar unit is mounted at the forward ends of the side rails.

4. A pickup truck rack as defined in claim 3, wherein said upstanding support members, said side rails, said crossbars and said stakes are made of tubular stock.